US005886729A

United States Patent [19]

Hiramatsu et al.

[11] Patent Number: 5,886,729

[45] **Date of Patent: *Mar. 23, 1999**

[54] SHEET SUPPLYING APPARATUS USING A FLEXIBLE ELASTIC PAWL MEMBER FOR SEPARATING SHEETS ONE BY ONE

[75] Inventors: Soichi Hiramatsu, Hachioji; Atsushi Noda, Kawasaki; Akira Miyakawa, Yokohama; Hideki Yamaguchi, Yokohama; Hiroyuki Inoue, Yokohama; Kenji Kawazoe, Yokohama; Takashi Nojima, Tokyo; Tetsuya Ishikawa, Yokohama; Hitoshi Nakamura, Kawasaki; Akira Kida, Yokohama; Hideaki Kawakami, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 968,894

[22] Filed: Nov. 6, 1997

Related U.S. Application Data

[63] Continuation of Ser. No. 235,801, Apr. 29, 1994, abandoned.

[30] Foreign Application Priority Data

May 10, 1993 [JP] Japan .................................... 5-132601

[51] Int. Cl.[6] ............................ B41J 2/435; G01D 15/24; H01S 1/131; G11B 7/00

[52] U.S. Cl. .......................... 347/264; 347/104; 347/216; 399/22; 271/9.07; 271/25

[58] Field of Search .................................... 271/116, 245, 271/124, 4.01, 5, 4.11, 9.07, 10.01, 11, 14, 10.09, 25; 347/104, 108, 4, 216, 264, 165; 214/216; 399/330, 315, 322; 428/219

[56] References Cited

U.S. PATENT DOCUMENTS

| | | | |
|---|---|---|---|
| 3,810,693 | 5/1974 | Matsumoto et al. | 399/178 |
| 4,429,865 | 2/1984 | Okada | 271/127 |
| 5,086,318 | 2/1992 | Takeda et al. | 399/303 |
| 5,114,133 | 5/1992 | Osada et al. | 271/127 |
| 5,171,006 | 12/1992 | Naito | 347/104 |
| 5,238,235 | 8/1993 | Nitta et al. | 347/108 |
| 5,364,195 | 11/1994 | Kanemitsu et al. | 347/4 |

FOREIGN PATENT DOCUMENTS

| | | |
|---|---|---|
| 528434 | 2/1993 | European Pat. Off. . |
| 1-064942 | 3/1989 | Japan . |
| 1-133835 | 5/1989 | Japan . |
| 3-013433 | 1/1991 | Japan . |

*Primary Examiner*—N. Le
*Assistant Examiner*—Raquel Yvette Gordon
*Attorney, Agent, or Firm*—Fitzpatrick, Cella, Harper & Scinto

[57] ABSTRACT

A sheet supply apparatus according to the present invention has a pawl separator for separating sheets one by one by regulating the tip ends and upper surfaces of tip end portions of the sheets, which pawl separator can be retarded from a sheet regulating position when it is urged by the sheet with a predetermined force. With this arrangement, sheets having small resiliency such as plain sheets are separated one by one by successively riding over the pawl separator, and sheets having great resiliency such as post cards and envelopes urge the pawl separator to a retracted position to pass through the pawl separator and are separated one by one by of another separation.

37 Claims, 10 Drawing Sheets

SHEET SUPPLYING APPARATUS USING A FLEXIBLE ELASTIC PAWL MEMBER FOR SEPARATING SHEETS ONE BY ONE

This application is a continuation of application Ser. No. 08/235,801, filed Apr. 29, 1994, now abandoned.

BACKGROUND OF THE INVENTION

1. Field of the Invention

The present invention relates to a sheet supply apparatus for separating stacked sheets one by one and for supplying the separated sheet, and an image forming apparatus having such a sheet supply apparatus and adapted to form an image on a supplied sheet.

2. Related Background Art

In the past, recording apparatuses such as printers, copying machines, facsimile machine and the like having a sheet supply apparatus have been so designed that an image comprised of a plurality of dots is formed on a sheet such as a paper sheet, a plastic film and the like by driving a recording head in response to image information. The recording apparatus of this kind utilizes an ink jet recording method, a wire dot recording method, a thermal recording method, an electrophotographic recording method or the like. Further, the sheet used with the recording apparatus of this type may be a plain paper sheet, a thick sheet such as a post card and an envelope, or a special sheet such as a plastic film. As means for supplying the sheet, a manual insertion sheet supply means for manually supplying the sheets one by one and an automatic sheet supply means for supplying stacked sheets one by one automatically and continuously by means of an automatic sheet supply apparatus are well-known.

The sheet supply apparatus is provided with a separation means for preventing the double-feed of sheets by separating the sheets one by one, which separation means is generally constituted by a separation pawl for holding down a front corner of the sheet. In the separating method using such a separation pawl, undulation is created in the front corner portion of the sheet by the resistance of the separation pawl, thereby separating the sheets one by one. This separating method is relatively simple and is highly reliable. In such a sheet supply apparatus, when the sheets are stacked on a stacking means, an operator depresses the stacking means downwardly to increase a distance between the separation pawl and a sheet stacking surface of the stacking means so that the stacking of the sheets is not obstructed by the separation pawl. After the sheets are stacked on the stacking means, the stacking means is returned to its original position so that the front corner of the sheet stack is held down by the separation pawl.

However, when the thick sheet such as an envelope and post card having high resiliency is supplied by using the conventional sheet supply apparatus having the above-mentioned separation pawl, since the thick sheet is caught by the separation pawl to make the separation of the sheets impossible, it is necessary to retract the separation pawl out of a sheet supplying path by a manual operation by using a lever and the like. In this condition, the thick sheets are separated from each other by difference in friction force between sheet-to-sheet and sheet-to-stacking means. Thus, when the sheets having high resiliency are used, the separation pawl must be manually retarded out of the sheet supplying path, thereby worsening the operability.

SUMMARY OF THE INVENTION

Therefore, an object of the present invention is to provide an automatic sheet supply apparatus and an image forming apparatus having such a sheet supply apparatus, in which, when a sheet having high resiliency is supplied, a sheet separation means can be automatically retracted out of a sheet supplying path with a simple arrangement.

To achieve the above object, according to the present invention, there is provided an arrangement wherein the sheet separation means is urged by an uppermost sheet of a sheet stack supplied by a supply means so that the separation means can be retarded out of the sheet supplying path in accordance with the magnitude of the resiliency of the sheet.

With this arrangement, when sheets such as plain paper sheets having small resiliency are supplied, the undulation is created in a front corner portion of the sheet having small resiliency by the resistance of the separation means, so that the uppermost sheet rides over the separation means to be separated from the other sheets. On the other hand, when sheets such as envelopes and post cards having great resiliency are supplied, since it is difficult to create the undulation in a front corner portion of the sheet having great resiliency, so that the front corner of the sheet cannot ride over the separation means, an uppermost sheet urges the separation means strongly, with the result that the separation means is retracted out of a sheet conveying path. Consequently, the sheets can advance without riding over the separation means and are separated one by one by another separation means.

DETAILED DESCRIPTION OF THE PREFERRED EMBODIMENTS

Figure 1:
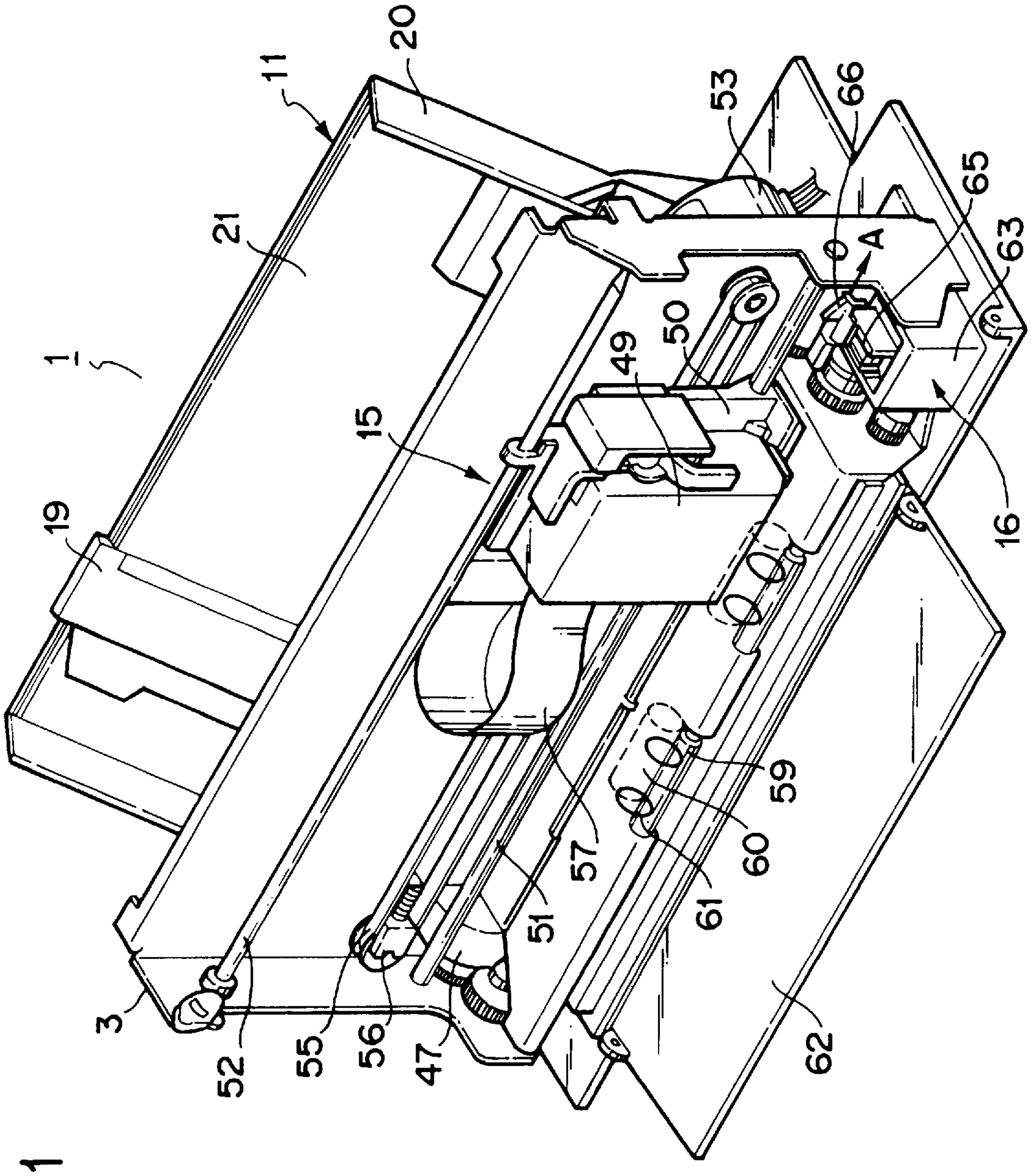
FIG. 1 is a perspective view of an image forming apparatus having a sheet supply apparatus according to preferred embodiment of the present invention.
Figure 2:
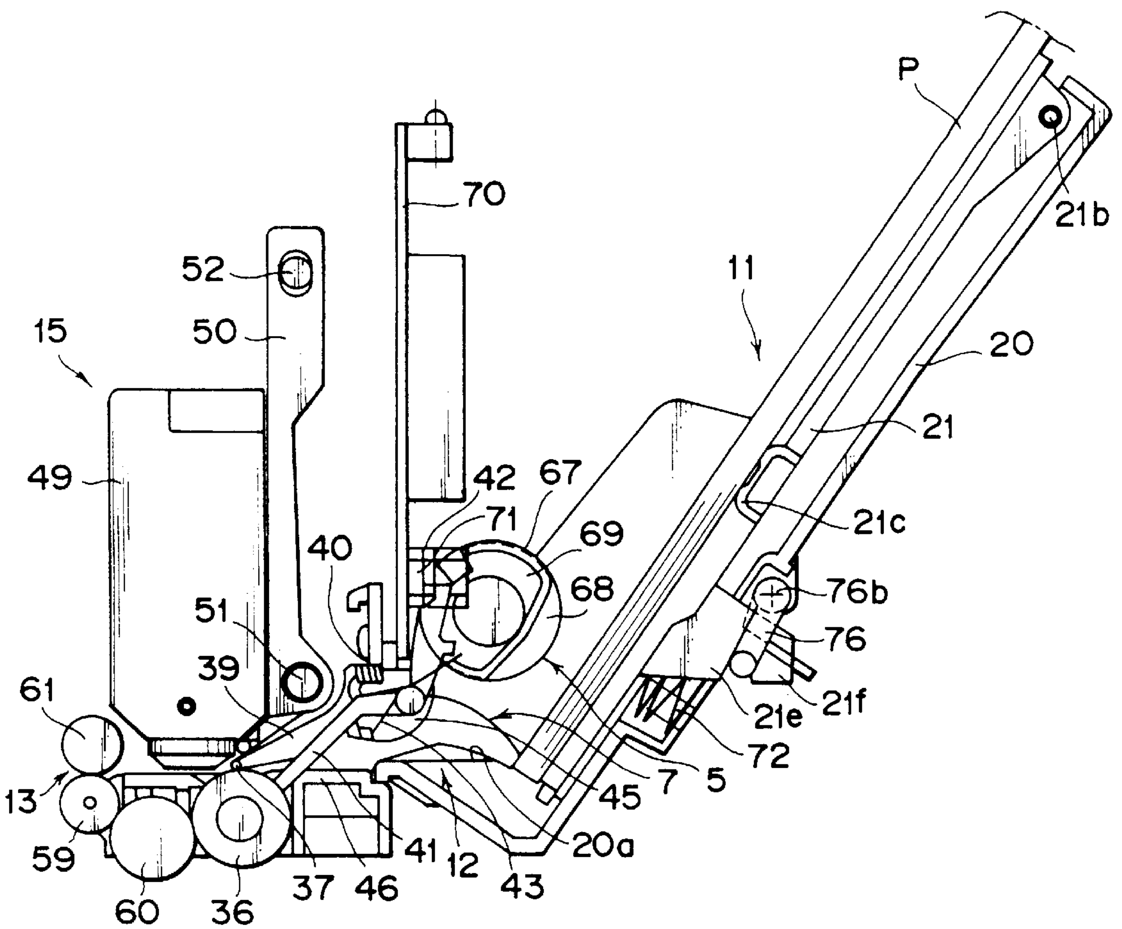
FIG. 2 is a side view of the image forming apparatus of FIG. 1.

FIG. 1 is a perspective view showing an image forming apparatus having a sheet supply apparatus according to a preferred embodiment of the present invention, and FIG. 2 is a side view of the image forming apparatus. The image forming apparatus 1 comprises a sheet supply portion 11 corresponding to a sheet supply apparatus, a sheet convey portion 12, a sheet discharge portion 13, a carriage portion 15 for performing image formation, and a cleaning portion 16 attached to the carriage portion. Now, these portions will be fully explained in order.

(A) Sheet supply portion

Figure 3:
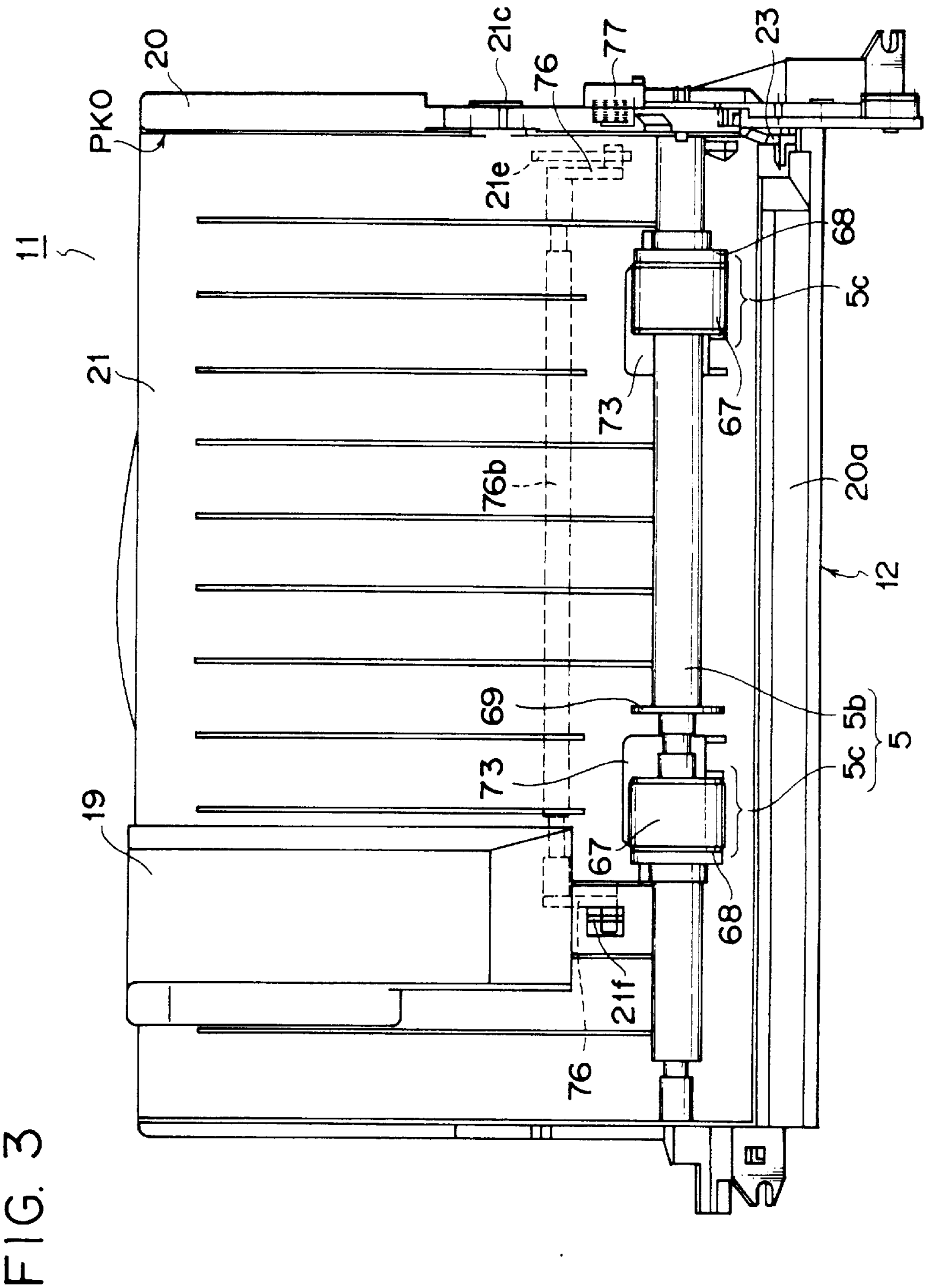
FIG. 3 is a front view of a sheet supply portion of the apparatus of FIG. 1.
Figure 4:
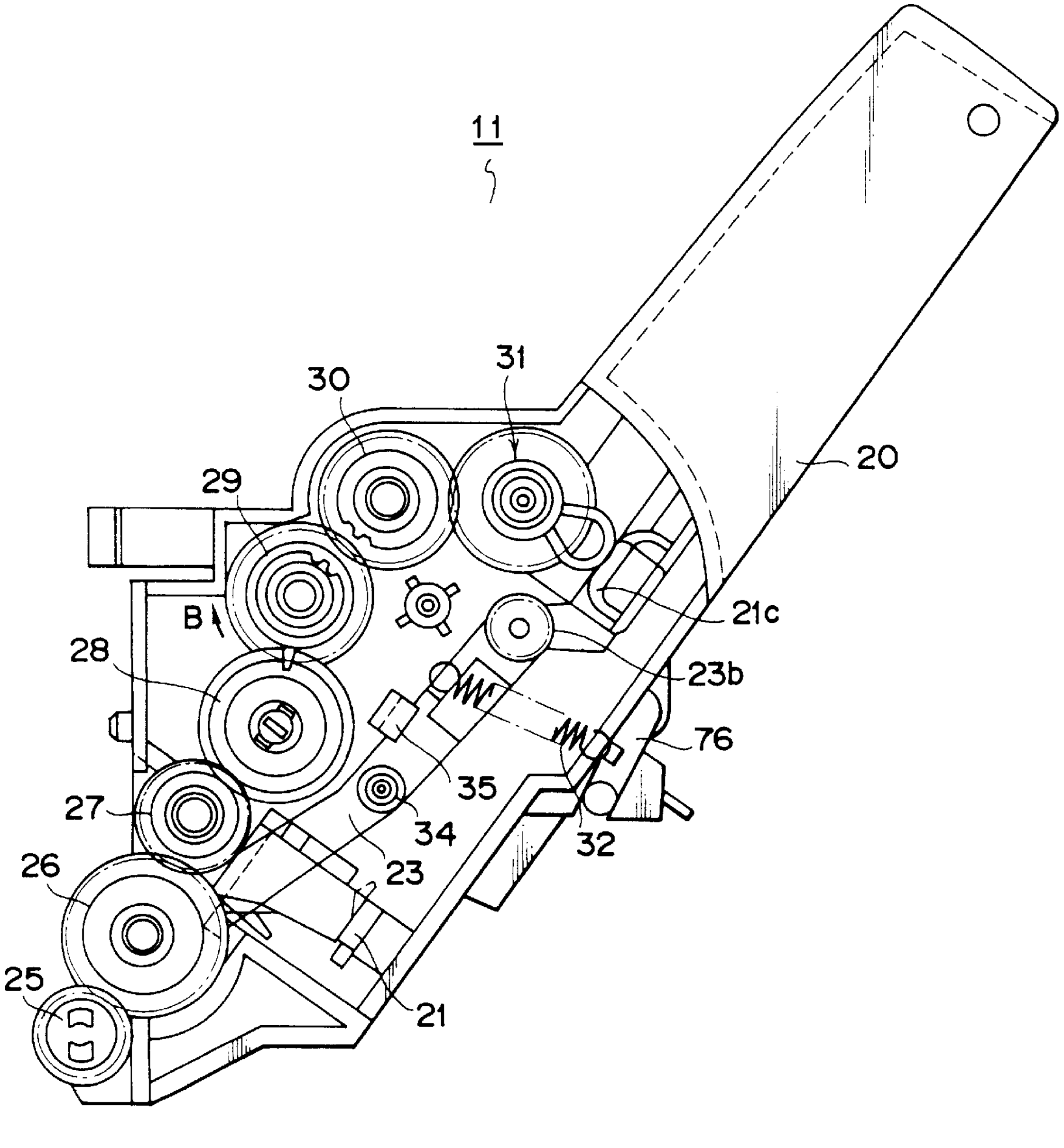
FIG. 4 is a side view of the sheet supply portion in a waiting condition.
Figure 5:
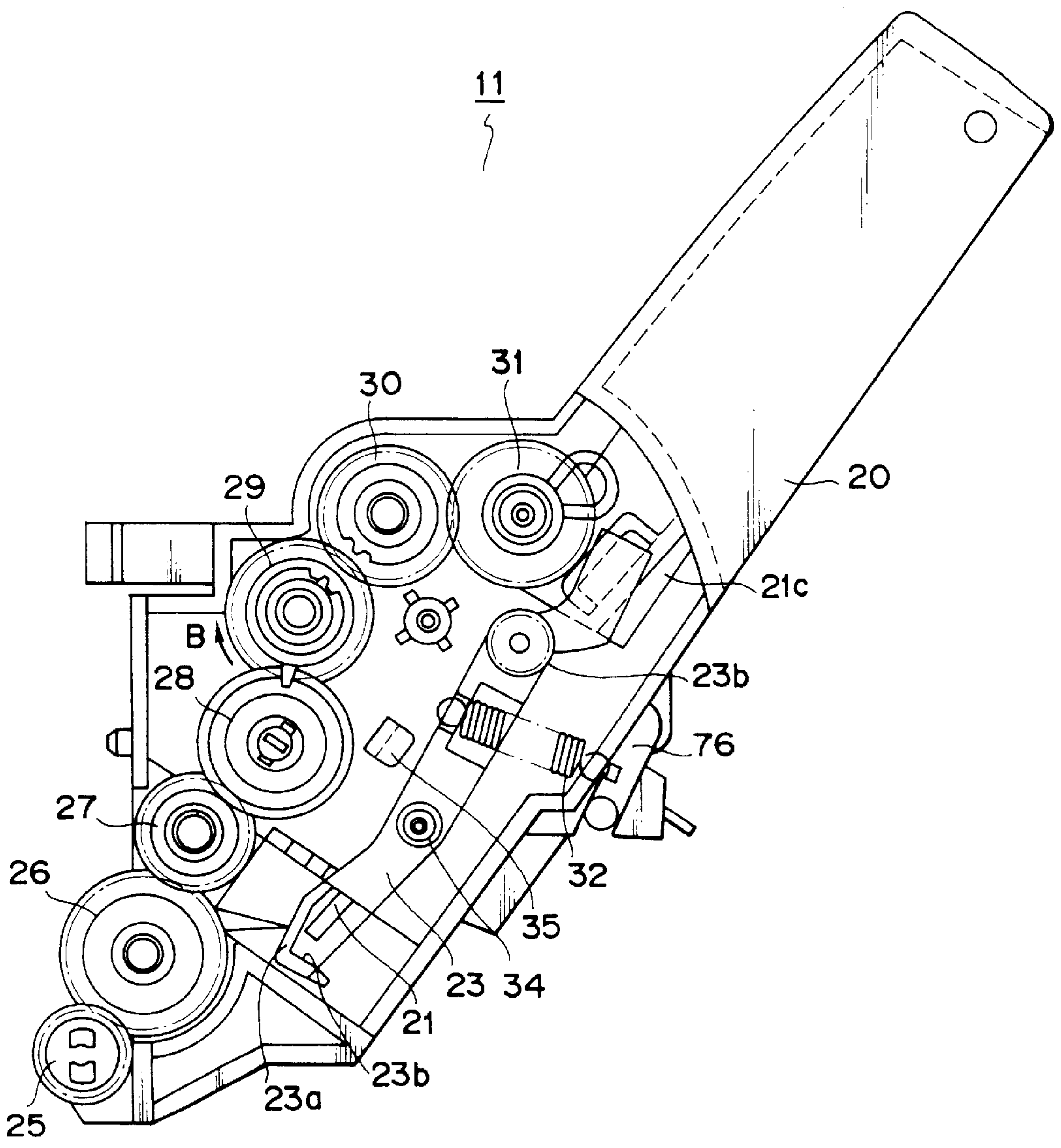
FIG. 5 is a side view of the sheet supply portion in a sheet supplying condition.

FIG. 3 is a front view of the sheet supply portion 11, and FIGS. 4 and 5 show a side view of the sheet supply portion.

The sheet supply portion 11 comprises a pressure plate (stacking means) 21 on which sheets are stacked, and a sheet supply rotary member (sheet supply means) 5 for supplying the sheet. The sheet supply portion is attached to a body of the image forming apparatus 1 at an angle of about 30–60 degrees. A movable side guide 19 is slidably mounted on the pressure plate 21 to regulate a stacking position for the sheets. Further, a base 20 is attached to a back surface of the pressure plate 21 and has a release cam 31. As shown in FIGS. 2 and 4, a separation pawl (separation means) 23 is arranged in a confronting relation to a front corner of a sheet stack rested on the pressure plate 21 and is associated with a lower end (for example, in FIG. 5) of the pressure plate 21. The separation pawl 23 is formed from a metal plate or molded plastics and can be rotated around a pivot portion 23*b*. Further, the separation pawl 23 is biased toward the pressure plate 21 by a pawl spring 32 arranged between a free end of the separation pawl 23 and the pivot portion 23*b*. Incidentally, the separation pawl 23 will be fully described later.

Further, the base 20 is connected to the pressure plate 21 via a pressure plate shaft 21*b* provided at an upper end of the pressure plate 21 so that the base can be rotated around the pressure plate shaft 21*b*. Further, the pressure plate 21 is biased toward the sheet supply rotary member 5 by pressure plate springs 72, and separation pads 73 made of material having great coefficient of friction such as synthetic leather are adhered to the pressure plate 21 in a confronting relation to sheet supply roller portions of the sheet supply rotary member to prevent the double-feed of the sheets P.

An inclined surface 20*a* is formed on a lower end of the base 20, which inclined surface 20*a* serves to separate the sheets which could not be separated by the separation pawl 23. That is to say, the sheets P fed out by the sheet supply rotary member 5 are abutted against the inclined surface 20*a*, and the sheets successively ride over the inclined surface 20*a* from the uppermost one, thereby separating the sheets one by one.

The sheet supply rotary member 5 is rotatably supported by the base 20 at its both ends. Further, a driving force of a convey roller 36 is transmitted to the sheet supply rotary member 5 via drive gears 25–30. The sheet supply rotary member 5 is a unitary element made of plastic material and comprises a shaft portion 5*b* and roller portions 5*c*. A sheet supply rotary member rubber layer 67 is coated on each roller portion 5*c* to supply and convey the sheet P. Further, each roller portion has a semi-circular cross-section, and an auxiliary roller 68 having a radius smaller than that of the rubber layer 67 by 0.5–3 mm is arranged at an outside of each roller portion 67. By providing these auxiliary rollers 68, when the sheet supplying operation is not effected, the contamination of an image on the sheet and positional deviation of the sheet due to the contact between the roller portions 5*c* and the sheet can be prevented. Further, there are two roller portions 5*c*, which roller portions are spaced apart from a sheet reference PKO by about 40 mm and about 170 mm, respectively. With this arrangement, when a sheet of A4 size is used, the sheet is conveyed by two roller portions 5*c*; whereas, when a small sized sheet such as a post card is used, the sheet is conveyed by only one roller portion nearer the sheet reference PKO.

A sensor plate 69 having a radius smaller than that of the sheet supply rotary member rubber layer 67 is attached to the shaft portion 5*b* of the sheet supply rotary member 5. The sensor plate 69 has a slit, so that, only when the pressure plate 21 is shifted in a release position or waiting position (FIG. 2) to disengage the sheet stack P from the sheet supply rotary member 5, a roller sensor 71 comprising a photo-interrupter provided on an electric substrate 70 can receive light. Accordingly, by detecting a condition of the sensor plate 69, it is possible to detect an angular position of the sheet supply rotary member 5 and an angular position of the release cam 31 moved in the same phase with the sheet supply rotary member 5, and, thus, to obtain the control timing in sheet supply sequence.

With this arrangement, in the waiting condition, a hold-down portion 21*c* of the pressure plate 21 is held down by the release cam 31 (refer to FIG. 4). As a result, the sheet stack P rested on the pressure plate 21 is disengaged from the sheet supply rotary member 5. In this waiting condition, when the driving force of the convey roller 36 is transmitted to the sheet supply rotary member 5 and the release cam 31 through the gears 25–30, since the release cam 31 is separated from the hold-down portion 21*c* of the pressure plate 21, the pressure plate 21 is lifted to a position shown in FIG. 5 (cocked in an anti-clockwise direction in FIG. 5), with the result that the separation pawl 23 associated with the lower end of the pressure plate 21 is abutted against the sheet stack P. At the same time, the sheet stack P is contacted with the sheet supply rotary member 5, so that the sheets P are separated one by one by the separation pawl 23 and the separated sheet is sent to the convey portion 12. Further, the sheet supply rotary member 5 and the release cam 31 are rotated (by one revolution) until the sheet P is sent to the convey portion 12. Then, the waiting condition that the sheet stack P is separated from the sheet supply rotary member 5 is restored again, and the driving force is disconnected from the sheet supply rotary member 5.

Further, as mentioned above, since the movable side guide 19 is mounted on the pressure plate 21, a side (lateral) edge of the sheet P (left edge in FIG. 3) is regulated by the movable side guide 19 and the other side edge of the sheet (right edge in FIG. 3) is regulated by the sheet reference PKO. In this way, even when sheets having different size are used, the stacking position of the sheets can be regulated.

(B) Sheet convey portion

The sheet convey portion 12 (refer to FIGS. 2 and 3) includes the convey roller 36 for conveying the sheet, and a PE sensor 42. A pinch roller 37 mounted on a free end of a pinch roller guide 39 is abutted against the convey roller 36 so that the pinch roller can be driven by rotation of the convey roller. By biasing the pinch roller guide 39 in an anti-clockwise direction in FIG. 2 by means of a pinch roller spring 40, the pinch roller 37 is urged against the convey roller 36, thereby creating a sheet conveying force. Further, an upper guide 45 for guiding the sheet P and a platen 46 are arranged in the proximity of an entrance portion 7 (FIG. 2) of the sheet convey portion 12 to which the sheet P is sent. Further, a PE sensor lever 41 is arranged above the upper guide 45. The PE sensor lever 41 is biased spring 43 in such a manner that the lever protrudes in the sheet conveying path. Further, a recording head (recording means) 49 for forming an image in response to image information is arranged behind (left side in FIG. 2) the convey roller 36.

With this arrangement, the sheet P sent to the sheet convey portion 12 is guided by the platen 46, pinch roller guide 39 and upper guide 45 to reach a nip between the convey roller 36 and the pinch roller 37. In this case, the PE sensor lever 41 is rotated by the moving sheet, so that a tip end of the sheet is detected by the PE sensor 42, thereby determining a recording position on the sheet. Further, the sheet P is conveyed along the platen 46 by rotating the rollers 36, 37 by means of an LF motor 47 (FIG. 1).

Incidentally, the recording head 49 may be an ink jet recording head which is integrally formed with an ink tank and can easily be exchanged and which is provided with electrothermal converter elements (not shown). In this recording head 49, heat can be applied to ink by the electrothermal converter elements. The ink is film-boiled by the heat and is discharged from discharge openings (not shown) of the recording head 49 due to pressure change caused by growth and contraction of bubbles generated by the film-boiling, thereby forming the image on the sheet P.

(C) Carriage portion

The carriage portion 15 (FIG. 1) includes a carriage 50 on which the recording head 49 is mounted. The carriage 50 is supported by a guide shaft 51 for reciprocally shifting the carriage in a direction perpendicular to the sheet conveying direction and a guide 52 for holding an upper end of the carriage 50 to maintain a predetermined gap between the recording head 49 and the sheet P. The guide shaft 51 and the guide 52 are attached to a frame 3. Further, the carriage 50 is driven by a carriage motor 53 mounted on a lower portion (right lower portion in FIG. 1) of the frame 3 via a timing belt 55. The timing belt 55 is supported and tensioned by an idle pulley 56. The carriage 50 is connected to a flexible cable 57 for transmitting a drive signal from an electric substrate 70 to the recording head 49.

With this arrangement, when the image is formed on the sheet P, the sheet P is shifted to an image forming line position (along the sheet convey direction) by the pair of rollers 36, 37 and the carriage 50 is shifted to an image forming row position (perpendicular to the sheet conveying direction), so that the recording head 49 is opposed to the image forming position. Thereafter, the ink is discharged from the recording head 49 toward the sheet P in response to the drive signal from the electric substrate 70, thereby forming the image.

(D) Sheet discharge portion (mainly refer to FIG. 2)

The sheet discharge portion 13 includes transmission rollers 60 abutted against the convey roller 36. The transmission rollers 60 are abutted against corresponding discharge rollers 59 against which corresponding spurs 61 are abutted. The discharge rollers 59 and the spurs 61 constitute pairs of rollers. Further, a discharge tray 62 (FIG. 1) is disposed at a downstream side of the discharge rollers 59 in the sheet convey direction. The driving force of the convey roller 36 is transmitted to the discharge rollers 59 through the transmission rollers 60. Further, each spur 61 is driven by rotation of the corresponding discharge roller 59.

With this arrangement, the sheet P on which the image was formed at the carriage portion 15 is pinched between a nip between the discharge rollers 59 and the spurs 61 and is discharged onto the discharge tray 62.

(E) Cleaning portion

The cleaning portion 16 (FIG. 1) includes a pump 63 for cleaning the recording head 49, a cap 65 for preventing the drying of the recording head 49, and a drive switching arm 66 for switching the driving force of the convey roller 36 between the sheet supply portion 11 and the pump 63. When the cleaning operation is not effected, the drive switching arm 66 is positioned at a position shown in FIG. 1 so that a planetary gear (not shown) rotatable around a central axis of the convey roller 36 is fixed at a predetermined position. On the other hand, when the drive switching arm 66 is shifted in a direction shown by the arrow A by shifting the carriage 50, the planetary gear is shifted in accordance with normal or reverse rotation of the convey roller 36 so that when the convey roller 36 is rotated normally the driving force is transmitted to the sheet supply portion 11 and when the convey roller 36 is rotated reversely the driving force is transmitted to the pump 63.

Next, the construction of the apparatus will be further fully explained (mainly with reference to FIGS. 1, 4 and 5).

As mentioned above, when the drive switching arm 66 of the cleaning portion 16 is shifted in the direction A by the carriage 50 and the convey roller 36 is rotated normally, the planetary gear is shifted to be engaged by an input gear 25. As a result, the driving force is transmitted to a sheet supply rotary member gear 28 connected to the sheet supply rotary member 5 via idler gears 26, 27, thereby rotating the sheet supply rotary member 5. Further, the driving force from the sheet supply rotary member gear 28 is transmitted to the release cam 31 via a clutch gear 29 and an idler gear 30. In this case, the sheet supply rotary member 5 and the release cam 31 are so designed that they are in phase with each other regarding their revolutions so that, in the waiting condition shown in FIG. 4, the sheet supply rotary member 5 having the semi-circular cross-section (a center angle of a flat portion is about 120 degrees) is opposed to the sheet stack P without contacting the latter, and, in the sheet supply operation, the sheet supply rotary member 5 is contacted with the sheet P with an abutment force of 200–500 grams. Further, the release cam 31 serves to lower the hold-down portion 21*c* to bring the pressure plate 21 to the waiting condition. In this case, one end of a pressure plate cam 76 is lowered forcibly by a cam 21*e* attached to the base 20 and a cam 21*f* provided on the pressure plate 21 is lowered forcibly by the other end of the pressure plate cam 76. As a result, the pressure plate 21 is lowered via the cam 21*f*. Incidentally, the pressure plate cam 76 can be rotated around a shaft 76*b*. Accordingly, when one end of the pressure plate 21 is lowered by lowering the hold-down portion 21*c*, since the pressure plate 21 is also lowered by the cam 21*f*, the pressure plate 21 is always maintained in a substantially parallel condition without distortion of the pressure plate.

The clutch gear 29 incorporates a cluth spring 77 (FIG. 3) therein, so that the clutch gear 29 cannot be reversely rotated in a direction shown by the arrow B (FIG. 4). Thus, when the registration is effected, the sheet supply rotary member 5 is abutted against the sheet P and is not rotated, thereby obtaining the good registration.

Figure 6A:
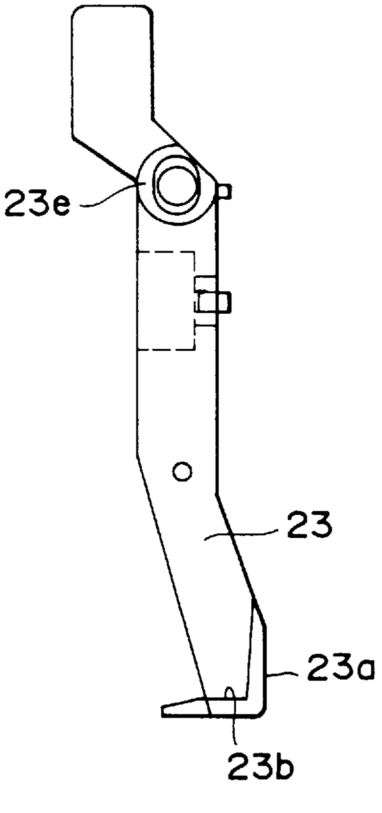
FIG. 6A is a side view of a separation pawl of the apparatus of FIG. 1.
Figure 6B:
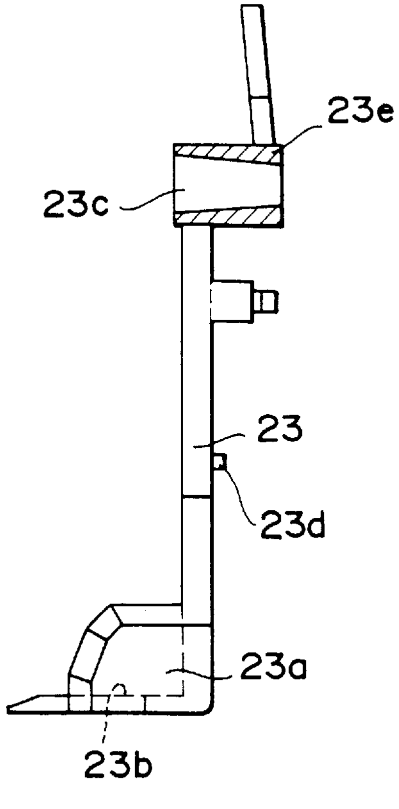
FIG. 6B is a plan view of the separation pawl.
Figure 7:
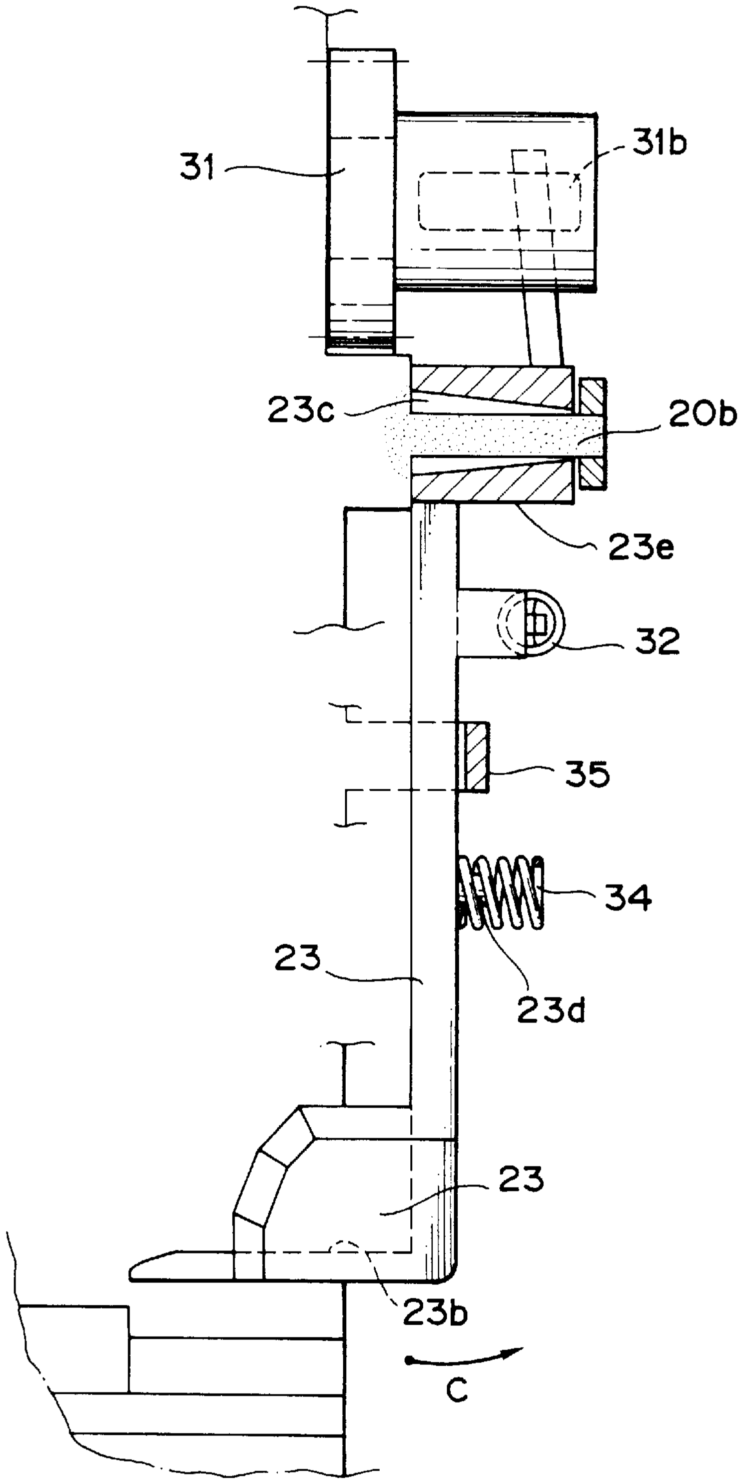
FIG. 7 is a plan view of the separation pawl in a waiting condition.
Figure 8:
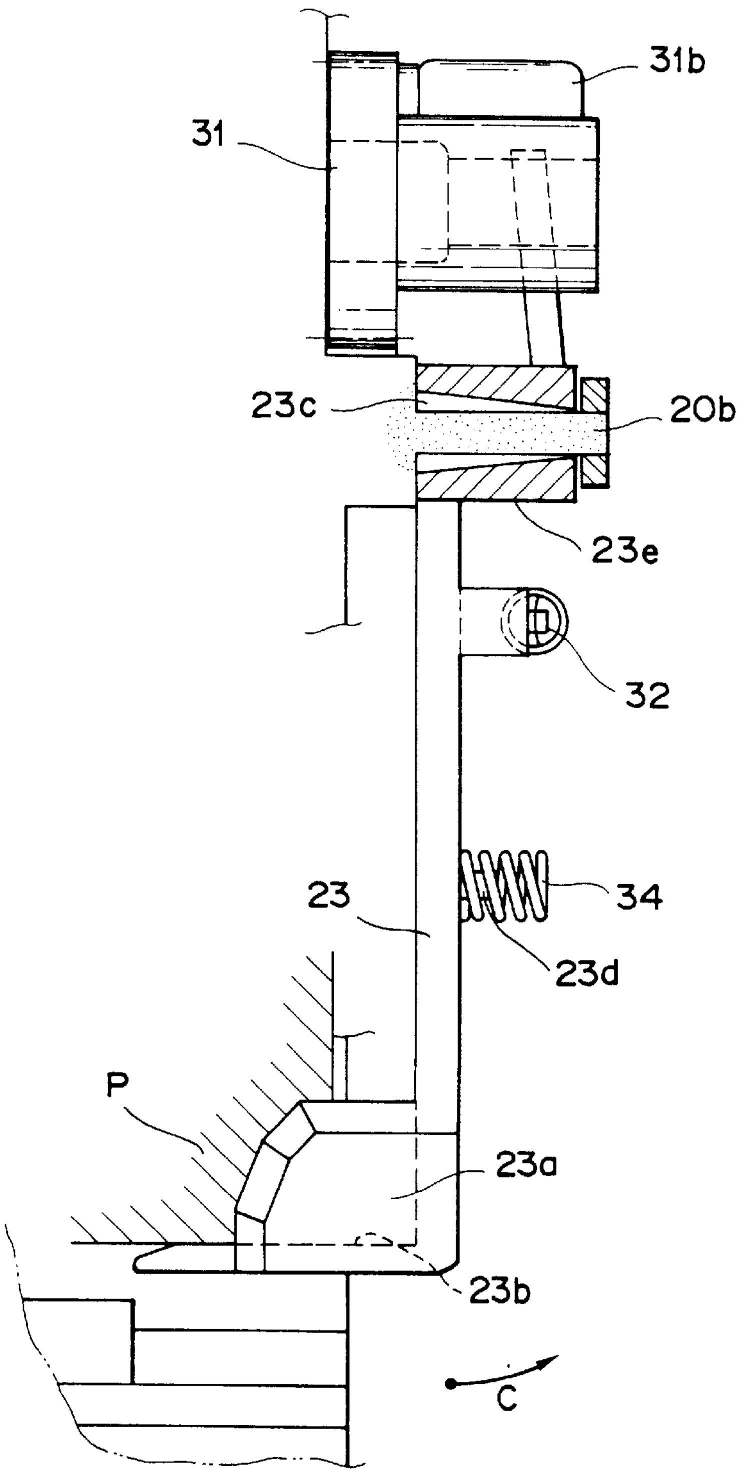
FIG. 8 is a plan view of the separation pawl in a sheet separating condition.
Figure 9:
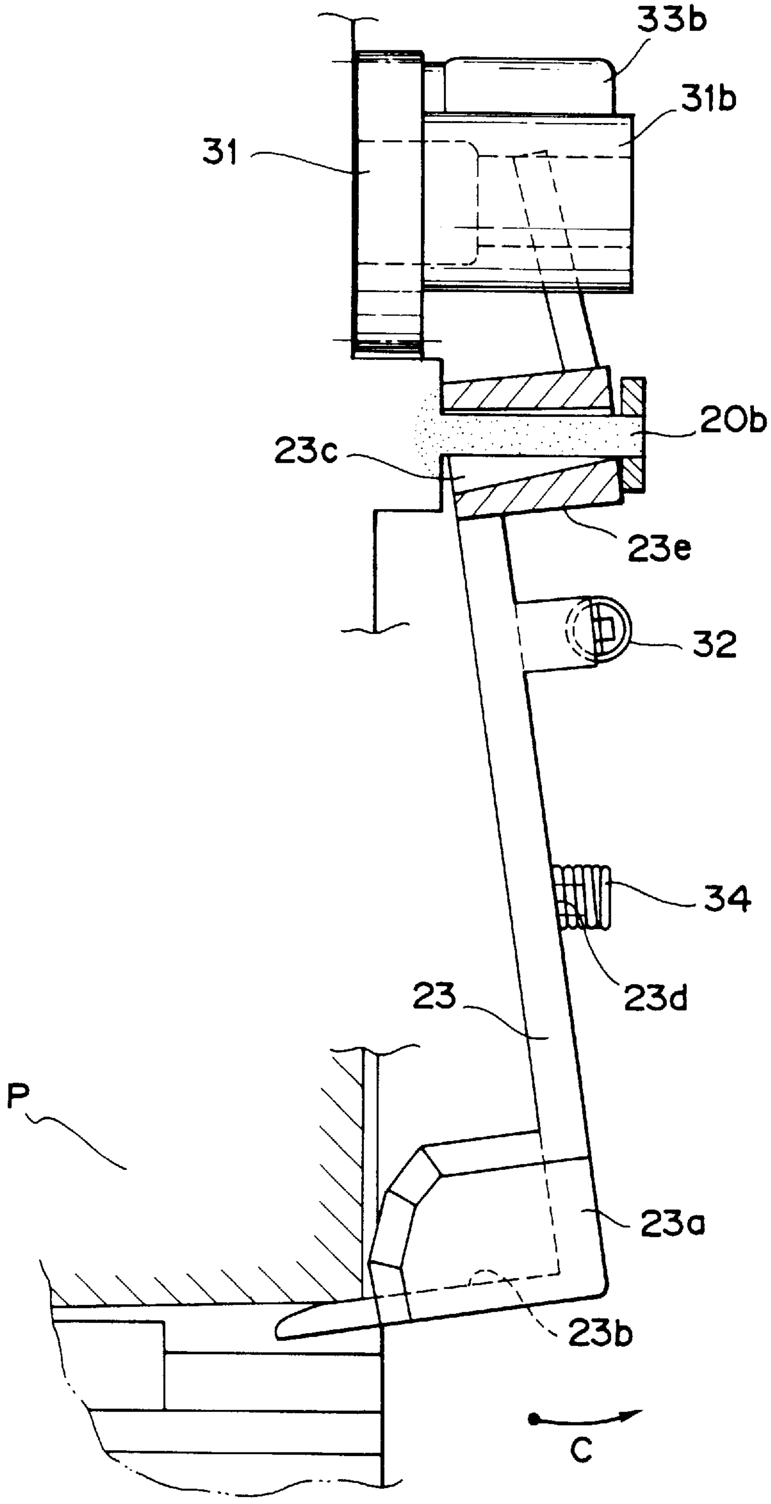
FIG. 9 is a plan view of the separation pawl in a retarded condition.

Next, the separation pawl 23 will be fully explained with reference to FIGS. 3 to 5 and FIGS. 6A and 6B to 9. FIG. 6A is a side view of the separation pawl, and FIG. 6B is a plan view of the separation pawl. FIG. 7 is a plan view of the separation pawl 23 in a waiting condition, FIG. 8 is a plan view of the separation pawl 23 in a sheet separating condition, and FIG. 9 is a plan view of the separation pawl 23 in a retarded condition. Incidentally, the waiting condition shown in FIGS. 4 and 7 is a condition before the sheet supply operation is started and when the operator stacks the sheets P on the pressure plate 21 of the sheet supply portion 11.

As mentioned above, the separation pawl 23 serves to separate the sheets P such as plain paper sheets and is arranged near the sheet reference PKO as shown in FIG. 3. The separation pawl has a triangular shape to cover a front corner of the sheet stack P. The separation pawl 23 has an upper surface regulating portion 23*a* for regulating an upper surface of the front corner of the sheet stack P, and a tip end regulating portion 23*b* for regulating a tip end of the front corner of the sheet stack P. The separation pawl 23 is rotatable around a fulcrum 23*e* and is biased by a pawl spring 32 to be abutted against the sheet stack P or the pressure plate 21 with a force of 20–100grams. Incidentally, the release cam 31 has a pawl cam 31*b* for bringing the pressure plate 21 to the waiting condition and for rotating the tip end of the separation pawl 23 upwardly to facilitate replenishment of the sheets P.

Further, the fulcrum 23*e* has a tapered central bore 23*c* widening toward the pressure plate 21. By inserting a shaft portion 20*b* formed on the base 20 into the tapered bore 23*c*, the separation pawl 23 can be rotated in a direction shown by the arrow C in FIGS. 7 to 9 to be retarded out of a sheet conveying path. Further, in the waiting condition shown in FIGS. 4 and 7, the separation pawl 23 is urged toward a direction opposite to the direction C by a pawl urging spring 34 at a hooked portion 23*d* of the separation pawl. Incidentally, even if a force directing to the direction C is applied to the separation pawl 23, the movement of the separation pawl is regulated by a pawl regulating portion (retract regulating means) 35. Thus, when the sheets P are stacked on the pressure plate 21 by the operator, the separation pawl 23 is not rotated in the direction C, with the result that the sheets P can surely be stopped at the upper surface regulating portion 23*a*.

By providing the separation pawl 23 in this way, when the sheets having small resiliency such as plain sheets are supplied, as shown in FIG. 8, the undulation is created in the front corner portion of the sheet P having small resiliency by the resistance of the separation pawl 23, so that the uppermost sheet can ride over the upper surface regulating portion 23*a* of the separation pawl 23 to be separated from the other sheets. Incidentally, a spring force of the pawl urging spring 34 is so selected that the separation pawl 23 is not shifted in the direction C (i.e. not retracted to the retarded position) by the sheet having small resiliency.

On the other hand, when the sheets having great resiliency such as envelopes, post cards and the like are supplied, since it is difficult to create the undulation in the front corner portion of the sheet having great resiliency and it is difficult for the sheet to ride over the upper surface regulating portion 23*a* of the separation pawl 23, the tip end regulating portion 23*b* of the separation pawl 23 is strongly urged by the uppermost sheet P. As a result, as shown in FIG. 9, the separation pawl 23 is rotated in the direction C in opposition to the spring force of the pawl urging spring 34, so that the separation pawl 23 is retracted out of the sheet conveying path. As a result, the sheet P can advance without riding over the upper surface regulating portion 23*a* of the separation pawl. Thereafter, the sheet P is abutted against the inclined surface 20*a* formed on the tip end (lower end in FIG. 2) of the base 20 to be separated from the other sheets.

In this way, the separation pawl 23 having the above construction can be retracted out of the sheet conveying path selectively by being urged by the uppermost sheet P supplied by the sheet supply rotary member 5 in accordance with the degree of the resiliency of the sheet P. Accordingly, even when the thick sheets having great resiliency such as envelopes and post cards are supplied, it is not required for the operator to manually retract the separation pawl 23 out of the sheet conveying path by means of a lever and the like. In addition, the separation pawl 23 has a simple construction. Incidentally, two separation pawls may be provided in association with both front corners of the sheet stack P.

Figure 10:
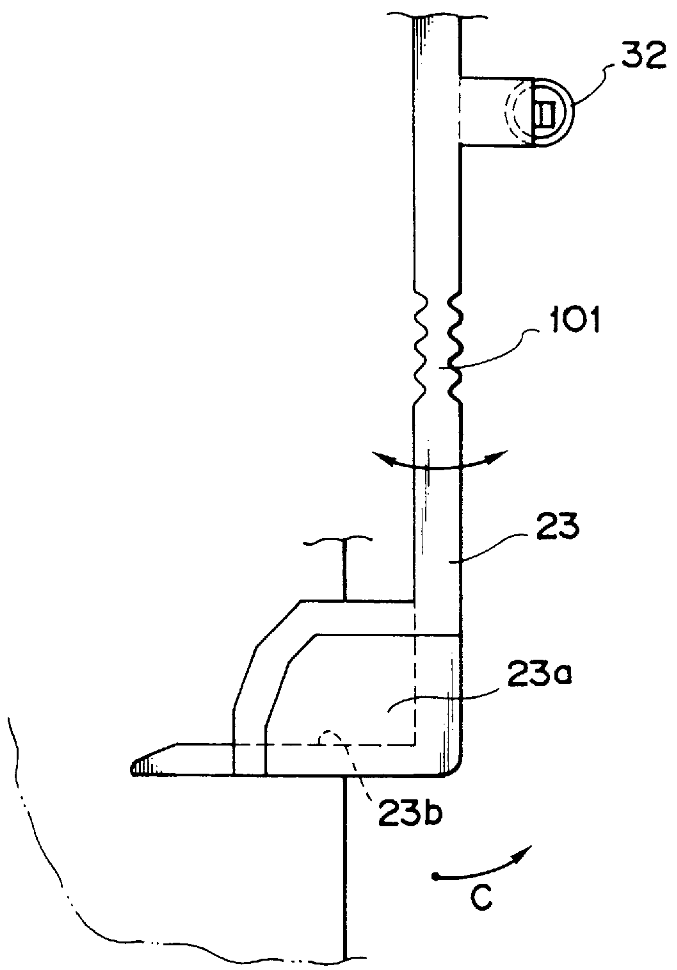
FIG. 10 is a partial plan view showing an alteration of the separation pawl.

FIG. 10 is a plan view showing an alteration of a separation pawl 23. In this alteration, in place of the pawl urging spring 34 in the above-mentioned embodiment, a flexible portion 101 which can be flexed toward the direction C by its own elasticity is provided in the separation pawl 23 at its central portion. With this arrangement, the separation pawl 23 can operate in the same manner as the above-mentioned embodiment, thereby achieving the same technical effect as that of the above-mentioned embodiment.

Incidentally, in this alteration, while the separation pawl 23 was retracted toward a widthwise direction of the sheet P, the separation pawl may be retracted upwardly or obliquely and upwardly. In such a case, an abutment angle between the tip end regulating portion 23*b* and the tip end of the sheet P, and a rocking direction of the separation pawl 23 may be appropriately determined.

According to the above-mentioned sheet supply apparatus, since the separation means can automatically be retracted out of the sheet conveying path in accordance with the degree of the resiliency of the sheet, the following technical effects can be obtained.

(1) it is not required to manually retract the separation means in accordance with the kind of sheets (plain sheet, post card, envelope or the like);

(2) since a space for arranging a lever for retracting the separation means can be eliminated, the apparatus can be made compact; and (3) the cost regarding the switching mechanism including the lever and the like can be reduced.

What is claimed is:

1. A sheet supplying apparatus comprising:

sheet supporting means for supporting a plurality of a first kind of sheets or a plurality of sheets of a second kind of sheets, the second kind having a larger resiliency than the sheets of the first kind;

sheet supply means for feeding out the plurality of sheets of the first kind and the plurality of sheets of the second kind;

pawl separation means provided movable between a regulating position for regulating the first kind of sheet and a non-regulating position for not regulating the second kind of sheet and being elastically urged toward the regulating position, said pawl separation means regulating in the regulating position a tip end portion of the plurality of first kind of sheets supported by said sheet supporting means for separating them one by one by causing the first kind of sheet fed out by said sheet supply means to ride over said pawl separation means, said pawl separation means being retracted to the non-regulating position as a result of being pushed by the second kind of sheets when the second kind of sheets are fed out by said sheet supply means by the reliency thereof; and sheet separation means disposed downstream of said pawl separation means for separating the second kind of sheets fed out by said sheet supply means when said pawl separation means is retracted to the non-regulating position.

2. A sheet supply apparatus according to claim 1, further comprising pawl supporting means for supporting said pawl separation means.

3. A sheet supply apparatus according to claim 2, wherein said pawl supporting means retractably supports said pawl separation means by combination of 10 a tapered bore and a shaft portion inserted into said tapered bore.

4. A sheet supply apparatus to claim 2, wherein said pawl separating means is elastically urged by a spring.

5. A sheet supply apparatus according to claim 1, wherein said pawl separation means has a flexible portion which can be flexed elastically so that, said pawl separation means is retracted from the regulating position to the non-regulating position, when it is urged by the sheet with a predetermined force.

6. A sheet supply apparatus according to claim 1, wherein said plurality of sheets of the first and the second kind form a stack and said pawl separation means is arranged only at one front corner of said stack.

7. A sheet supply apparatus according to claim 6, wherein said pawl separation means is arranged at a side of a sheet supply reference.

8. A sheet supply apparatus according to one of claims 1 to 7, wherein said pawl separation means is retractable to a side of the sheets supported by said sheet supporting means.

9. A sheet supply apparatus according to claim 1, wherein said sheet supporting means has a pressure plate for supporting the sheet, and a spring for biasing said pressure plate toward said sheet supply means.

10. A sheet supply apparatus according to claim 1, wherein said sheet separation means has an inclined surface onto which the sheets are abutted to ride over it to be separated into individual sheets.

11. A sheet supplying apparatus comprising:

sheet supporting means for supporting a plurality of sheets of a first kind and a plurality of sheets of a second kind, the second kind of sheet having larger resiliency than the first kind of sheet;

sheet supply means for feeding out the plurality of sheets of the first kind or the plurality of sheets of the second kind;

pawl separation means provided movable between a regulating position for regulating the first kind of sheet and a non-regulating position for not regulating the second kind of sheet, and being elastically urged toward the regulating position, said pawl separation means having an upper surface regulating portion for regulating an upper surface of a tip end of the first kind of sheet and a tip end regulating portion for regulating a tip end of the first kind of sheet supported by said sheet supporting means integrally, said pawl separation means in the regulating position separating the first kind of sheets one by one, by causing the first kind of sheet fed out by said sheet supply means to ride over said upper surface regulating portion, said pawl separation means being shifted to the non-regulating position as a result of being pushed by the second kind of sheets when the second kind of sheets are fed out by said sheet supply means by resiliency thereof; and sheet separation means disposed downstream of said pawl separation means for separating the second kind of sheets fed out by said sheet supply means one by one in a condition that said upper surface regulating portion and said tip end regulating portion are retracted to the non-regulating position.

12. A sheet supply apparatus according to claim 11, wherein said upper surface regulating portion is abutted against an upper surface adjacent a front corner of the sheet to regulate an upward movement of said front corner, and said tip end regulating portion is abutted against a front side of a tip end of said front corner to regulate a movement of said front corner in a sheet supplying direction.

13. A sheet supply apparatus according to claim 11, wherein said pawl separation means is retracted to a side of the sheets supported by said sheet supporting means.

14. A sheet supplying apparatus comprising:

sheet supporting means for supporting a plurality of sheets of a first kind or a plurality of sheets of a second kind, the sheet of second kind having a larger resiliency than the sheet of the first kind;

sheet supply means for feeding out the sheets supported on the sheet supporting means;

pawl separation means provided movable between a regulating position for regulating the sheet and a non-regulating position for not regulating the sheet, and being elastically urged toward the regulating position, wherein said pawl separation means in the regulating position regulates a tip end portion of the sheets of the first kind fed out by said sheet supply means for separating them one by one by causing the sheet of the first kind to ride over said pawl separation means, and said pawl separation means is retracted to the non-regulating position as a result of being pushed by the sheet of second kind fed out by said sheet supply means; and sheet separation means for separating the sheets of the second kind fed by said sheet supply means one by one when said pawl separation means is retracted to the non-regulating position.

15. A sheet supplying apparatus according to claim 14, wherein said pawl separation means has a separation pawl arranged at one front corner of the sheets supported on said sheet supporting means.

16. A sheet supplying apparatus according to claim 15, wherein said separation pawl is rotatably supported between the regulating position and the non-regulating position and said separation pawl is urged toward the regulating position by a spring.

17. A sheet supplying apparatus comprising:

a base;

a pressure plate on which a plurality of sheets of a first kind or a plurality of sheets of a second kind are stacked, the sheets of the second kind having a larger resiliency than the sheets of the first kind;

a feed roller disposed at a position above the sheets stacked on the pressure plate;

a pressure plate spring for urging said pressure plate toward to the feed roller whereby the sheet on the pressure plate are abutted against the feed roller;

a separation pawl rotatably mounted on the base;

a pawl spring urging said separation pawl toward a position to separate the sheets of the first kind one by one, wherein said separation pawl is rotated by being abutted by the sheet of the second kind fed out by said feed roller against an urging force by said pawl spring; and a sheet separation face for separating the sheets of the second kind one by one when said separation pawl is rotated by the sheets of the second kind.

18. A sheet supplying apparatus according to claim 17, wherein said sheet separation face is inclined and the sheets of the second kind are abutted to ride over said sheet separation face to be separated into individual sheets.

19. An image forming apparatus comprising:

sheet supporting means for supporting a plurality of a first kind of sheets or a plurality of sheets of a second kind of sheets, the second kind having a larger resiliency than the sheets of the first kind;

sheet supply means for feeding out the plurality of sheets of the first kind and the plurality of sheets of the second kind;

pawl separation means provided movable between a regulating position for regulating the first kind of sheet and a non-regulating position for not regulating the second kind of sheet and being elastically urged toward the regulating position, said pawl separation means regulating in the regulating position a tip end portion of the plurality of first kind of sheets supported by said sheet supporting means for separating them one by one by causing the first kind of sheet fed out by said sheet supply means to ride over said pawl separation means, said pawl separation means being retracted to the non-regulating position as a result of being pushed by the second kind of sheets when the second kind of sheets are fed out by said sheet supply means by the resiliency thereof;

sheet separation means disposed downstream of said pawl separation means for separating the second kind of sheets fed out by said sheet supply means when said pawl separation means is retracted to the non-regulating position; and image forming means for forming an image on the sheet fed out by said sheet supply apparatus.

20. An image forming apparatus according to claim 19, further comprising pawl supporting means for supporting said pawl separation means.

21. An image forming apparatus according to claim 20, wherein said pawl supporting means retractably supports said pawl separation means by combination of a tapered bore and a shaft portion inserted into said tapered bone.

22. An image forming apparatus according to claim 20, wherein said pawl separating means is elastically urged by a spring.

23. An image forming apparatus according to claim 19, wherein said pawl separation means has a flexible portion which can be flexed elastically so that, said pawl separation means is retracted from the regulating position to the non-regulating position, when it is urged by the sheet with a predetermined force.

24. An image forming apparatus according to claim 19, wherein said plurality of sheets of the first kind and the second kind form a stack and said pawl separation means is arranged only at one front corner of said stack.

25. An image forming apparatus according to claim 24, wherein said pawl separation means is arranged at a side of a sheet supply reference.

26. An image forming apparatus according to one of claims 19 to 25, wherein said pawl separation means is retractable to a side of the sheets supported by said sheet supporting means.

27. An image forming apparatus according to claim 19, wherein said sheet supporting means has a pressure plate for supporting the sheet, and a spring for biasing said pressure plate toward said sheet supply means.

28. An image forming apparatus according to claim 19, wherein said sheet separation means has an inclined surface onto which the sheets are abutted to ride over it to be separated into individual sheets.

29. An image forming apparatus comprising:

sheet supporting means for supporting a plurality of sheets of a first kind and a plurality of sheets of a second kind, the second kind of sheet having larger resiliency than the first kind of sheet;

sheet supply means for feeding out the plurality of sheets of the first kind or the plurality of sheets of the second kind;

pawl separation means provided movable between a regulating position for regulating the first kind of sheet and a non-regulating position for not regulating the second kind of sheet, and being elastically urged toward the regulating position, said pawl separation means having an upper surface regulating portion for regulating an upper surface of a tip end of the first kind of sheet and a tip end regulating portion for regulating a tip end of the first kind of sheet supported by said sheet supporting means integrally, said pawl separation means in the regulating position separating the first kind of sheets one by one, by causing the first kind of sheet fed out by said sheet supply means to ride over said upper surface regulating portion, said pawl separation means being shifted to the non-regulating position as a result of being pushed by the second kind of sheets when the second kind of sheets are fed out by said sheet supply means by resiliency thereof;

sheet separation means disposed downstream of said pawl separation means for separating the second kind of sheets fed out by said sheet supply means one by one in a condition that said upper surface regulating portion and said tip end regulating portion are retracted to the non-regulating position; and image forming means for forming an image on the sheet fed out by said sheet supply apparatus.

30. An image forming apparatus according to claim 29, wherein said upper surface regulating portion is abutted against an upper surface adjacent a front corner of the sheet to regulate an upward movement of said front corner, and said tip end regulating portion is abutted against a front side of a tip end of said front corner to regulate a movement of said front corner in a sheet supplying direction.

31. An image forming apparatus according to claim 29, wherein said pawl separation means is retracted to a side of the sheets supported by said sheet supporting means.

32. An image forming apparatus comprising:

sheet supporting means for supporting a plurality of sheets of a first kind or a plurality of sheets of a second kind, the sheet of second kind having a larger resiliency than the sheet of the first kind;

sheet supply means for feeding out the sheets supported on the sheet supporting means;

pawl separation means provided movable between a regulating position for regulating the sheet and a non-regulating position for not regulating the sheet, and being elastically urged toward the regulating position, wherein said pawl separation means in the regulating position regulates a tip end portion of the sheets of the first kind fed out by said sheet supply means for separating them one by one by causing the sheet of the first kind to ride over said pawl separation means, and said pawl separation means is retracted to the non-regulating position as a result of being pushed by the sheet of second kind fed out by said sheet supply means;

sheet separation means for separating the sheets of the second kind fed by said sheet supply means one by one when said pawl separation means is retracted to the non-regulating position; and image forming means for forming an image on the sheet fed out by said sheet supply apparatus.

33. An image forming apparatus according to claim 32, wherein said pawl separation means has a separation pawl arranged at one front corner of the sheets supported on said sheet supporting means.

34. An image forming apparatus according to claim 33, wherein said separation pawl is rotatably supported between the regulating position and the non-regulating position and said separation paw is urged toward the regulating position by a spring.

35. An image forming apparatus comprising:

a base;

a pressure plate on which a plurality of sheets of a first kind or a plurality of sheets of a second kind are stacked, the sheets of the second kind having a larger resiliency than the sheets of the first kind;

a feed roller disposed at a position above the sheets stacked on the pressure plate;

a pressure plate spring for urging said pressure plate toward to the feed roller whereby the sheet on the pressure plate are abutted against the feed roller;

a separation pawl rotatably mounted on the base;

a pawl spring urging said separation pawl toward a position to separate the sheets of the first kind one by one, wherein said separation pawl is rotated by being abutted by the sheet of the second kind fed out by said feed roller against an urging force by said pawl spring;

a sheet separation face for separating the sheets of the second kind one by one when said separation pawl is rotated by the sheets of the second kind; and image forming means for forming an image on the sheet fed out by said sheet supply apparatus.

36. An image forming apparatus according to claim 35, wherein said sheet separation face is inclined, wherein the sheets of the second kind are abutted to ride over said sheet separation face to be separated into individual sheets.

37. An image forming apparatus according to anyone of claims 19–25 and 27–36, wherein said image forming means is an ink jet recording apparatus in which electrothermal converter element is selectively energized in response to an image signal to discharge the ink from a discharge opening due to growth of bubble caused by heat exceeding the film-boiling generated by said electrothermal converter element, thereby forming the image on the sheet.

* * * * *

UNITED STATES PATENT AND TRADEMARK OFFICE
CERTIFICATE OF CORRECTION

PATENT NO. : 5,886,729

DATED : March 23, 1999

INVENTOR(S) : SOICHI HIRAMATSU, ET AL.

It is certified that error appears in the above-identified patent and that said Letters Patent is hereby corrected as shown below:

COLUMN 8,
Line 26, "of sheets" (2nd occurrence) should be deleted.
Line 46, "reliency" should read --resiliency--;
Line 53, "supply" should read --supplying--;
Line 56, "supply" should read --supplying--;
Line 58, "10" should be deleted;
Line 60, "supply" should read --supplying--, and "to" should read --according to--; and
Line 62, "supply" should read --supplying--.

COLUMN 9,
Line 1, "supply" should read --supplying--;
Line 4, "supply" should read --supplying--;
Line 7, "supply" should read --supplying--;
Line 10, "supply" should read --supplying--;
Line 14, "supply" should read --supplying--;
Line 43, "resiliency" should read --the resiliency--;
Line 50, "supply" should read --supplying--; and
Line 57, "supply" should read --supplying--.

COLUMN 10,
Line 12, "second" should read --the second--;
Line 36, "sheet" should read --sheets--; and
Line 44, "sheet" should read --sheets--.

UNITED STATES PATENT AND TRADEMARK OFFICE

CERTIFICATE OF CORRECTION

PATENT NO. : 5,886,729

DATED : March 23, 1999

INVENTOR(S) : SOICHI HIRAMATSU, ET AL.

It is certified that error appears in the above-identified patent and that said Letters Patent is hereby corrected as shown below:

COLUMN 12,
Line 11, "resiliency" should read --the resiliency--;
Line 20, "apparatus." should read --means.--;
Line 35, "second" should read --the second--;
Line 50, "second" should read --the second--; and
Line 66, "paw" should read --pawl--.

COLUMN 13,
Line 10, "to" should be deleted, and "sheet" should read --sheets--.

COLUMN 14,
Line 10, "anyone" should read --any one--; and
Line 12, "electrothermal" should read --an electrothermal--.

Signed and Sealed this

Fourth Day of January, 2000

Attest:

Q. Todd Dickinson

*Attesting Officer*

*Acting Commissioner of Patents and Trademarks*